United States Patent [19]

Miller

[11] Patent Number: 5,800,588
[45] Date of Patent: Sep. 1, 1998

[54] NESTABLE, RIGID FILTER FRAME

[75] Inventor: William D. Miller, Hideaway Hills, Ohio

[73] Assignee: Superior Fibers, Inc., Bremen, Ohio

[21] Appl. No.: 900,621

[22] Filed: Jul. 25, 1997

Related U.S. Application Data

[63] Continuation-in-part of Ser. No. 754,283, Nov. 20, 1996, abandoned.

[51] Int. Cl.$^6$ .................................................. B01D 46/10
[52] U.S. Cl. ........................... 55/494; 55/495; 55/511; 55/DIG. 31; 55/DIG. 42
[58] Field of Search .................. 55/494, 495, 511, 55/DIG. 31, DIG. 42; 156/77, 78, 79, 214, 293

[56] References Cited

U.S. PATENT DOCUMENTS

| | | |
|---|---|---|
| 3,023,839 | 3/1962 | Best . |
| 3,127,259 | 3/1964 | Boylan . |
| 3,970,440 | 7/1976 | Copenhefer et al. . |
| 4,105,423 | 8/1978 | Latakas et al. . |
| 4,636,233 | 1/1987 | Lizmore . |
| 5,232,480 | 8/1993 | Licatovich . |

*Primary Examiner*—Jay H. Woo
*Assistant Examiner*—Minh-Chau T. Pham
*Attorney, Agent, or Firm*—Frank H. Foster; Kremblas, Foster, Millard & Pollick

[57] ABSTRACT

A filter having a nestable frame including a first leg, a second leg extending obtusely from the first leg, and a third leg extending from the second leg and forming a channel between the second and third legs. A brace having similar first, second and third legs is mounted to the frame, with the second and third legs of the brace preferably extending into the channel of the frame. A chamber is formed by the second and third legs of the frame and the second and third legs of the brace. The chamber is preferably filled with material which rigidities the box beam structure formed by the walls surrounding the chamber. A filter medium material attaches to the frame, by adhesion and/or by clamping engagement between the first legs of the frame and brace.

17 Claims, 10 Drawing Sheets

NESTABLE, RIGID FILTER FRAME

This application is a continuation-in-part of application Ser. No. 08/754,283 filed Nov. 20, 1996, and now abandoned.

TECHNICAL FIELD

This invention relates generally to the structure of filters having a filter medium mounted in a supporting frame.

BACKGROUND ART

Filters are typically provided in heating, ventilating and air conditioning equipment upstream of the air impeller for removing particulate impurities from the air principally in order to protect the equipment, and secondarily to remove the particulate impurities from the air being circulated within homes, offices and industrial environments. Such filters are also used for removing impurities entrained in air or another gas prior to release of the gas into the atmosphere. Various industrial processes also use filters for removing particulates from gases or other fluids.

Filters are typically formed by mounting a panel of a filter medium, such as a fibrous mat or porous foam, within a surrounding support frame. The frame supports the filter medium in a relatively planar shape and provides mechanical strength for retaining the filter in a manner which is not only mechanically secure but also seals well to its associated machinery so that all of the fluid flow is directed through the filter medium.

It is desirable that a filter be inexpensive and have sufficient strength and durability. Especially important is the frame's strength at the corners where a joint is formed and where it is most likely to be weak. When a frame is weak in the corners it twists when the filter is handled, causing the filter to appear weak and substandard. It is also desirable to maximize the effective filtering area of a filter and to permit the compact packaging of multiple filters for efficient distribution and storage.

U.S. Pat. Nos 3,970,440 and 4,105,423 show filters having a frame of the type generally known in the trade as a pinch frame. They utilize a frame constructed of a folded sheet of material that has flanges which extend over and cover a peripheral portion of both major faces of the filter medium. These flanges pinch the peripheral portion of the filter medium, attaching the filter medium to the frame. U.S. Pat. No. 4,105,423 also shows a tubular structure on the filter frame for increased strength and rigidity.

U.S. Pat. No. 3,023,839 to Best illustrates a filter in which the filter medium is also compressed or pinched around its peripheral edges for purposes of attaching the filter medium to the frame. The filter frame has outwardly sloped walls so that a plurality of filters may be stacked and nested and the filter medium may be compressed for compaction into higher density, and therefore more efficient, compact packaging.

The peripheral pinching of all three of these filters significantly decreases the spacing between the filter fibers and therefore increases the density of the fibers around the peripheral region of the filter medium. That, in turn, increases the flow resistance through the peripheral region. As a consequence, fluid flow through the filter is more concentrated near the central portion of the filter medium. The result is that the effective area of the filter is reduced by the peripheral pinching. The figures of these patents illustrate the extent to which the higher flow resistance areas extend from the frame toward the center of the media. Consequently, the overall size of the filter must be enlarged to provide an increased area to make up for the area loss resulting from reduced flow in the peripherally pinched region of the filter.

U.S. Pat. No. 4,636,233 shows a similar pinch frame construction. Because the frame material extends over the peripheral portion of both opposite, major faces of the uncompressed filter medium, the filter medium in this patent cannot be compressed without distorting and damaging the frame.

U.S. Pat. No. 3,127,259 illustrates a filter which is incapable of being compressed. U.S. Pat. No. 5,232,480 illustrates a frame which is foldable to permit compression of the filter medium, but requires physical manipulation to rearrange the frame in its intended operating structural relationship.

There is therefore a need for, and it is an object and feature of this invention to provide, a filter having a frame with a configuration which permits nesting of a stack of such filters, and inexpensively provides enhanced rigidity of the frame, especially at the corners.

BRIEF DISCLOSURE OF INVENTION

The invention is a filter comprising a filter medium panel, a frame member and a brace member. The filter medium panel has peripheral edges and first and second opposite major faces. The frame member surrounds the peripheral edges of the filter medium panel. The frame has a cross-section comprising a first leg abutting the first major filter medium panel face near its periphery, and a second leg extending obtusely from the first leg permitting nesting, and spaced outwardly of the filter medium panel. The frame also has a third leg extending from and located outwardly of the second leg to form a channel between the second and third legs. The brace member is mounted to the frame member, and has a cross-section comprising a second leg and a third leg extending from and located outwardly of the second leg to form a channel between the second and third legs. The second and third legs of one member are nested within the channel of the other member forming a chamber between, and defined by, the second and third legs of the frame member and the second and third legs of the brace member. It is contemplated that the chamber contains a cellular, porous material, such as a rigid foam or glue, adhered to the legs defining its boundaries.

Figure 1:
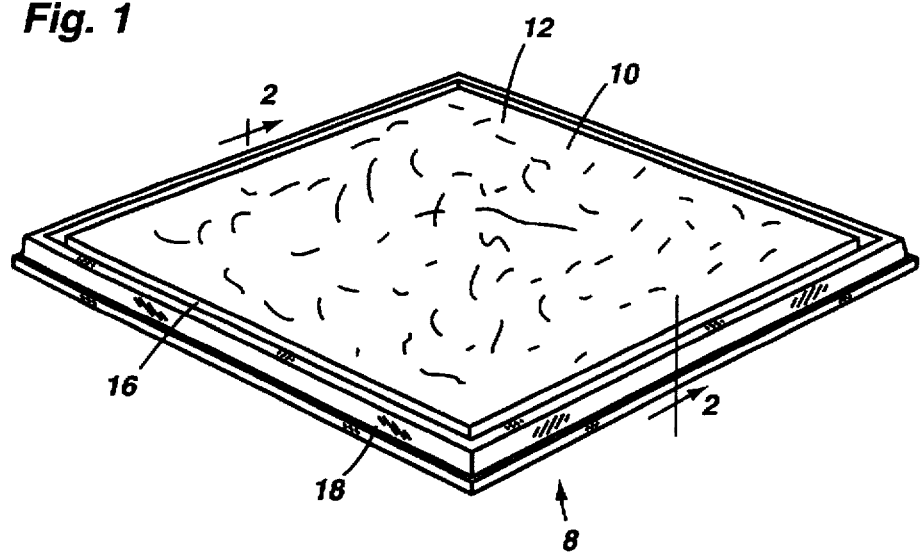
FIG. 1 is a view in perspective illustrating an embodiment of the invention.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Figure 2:
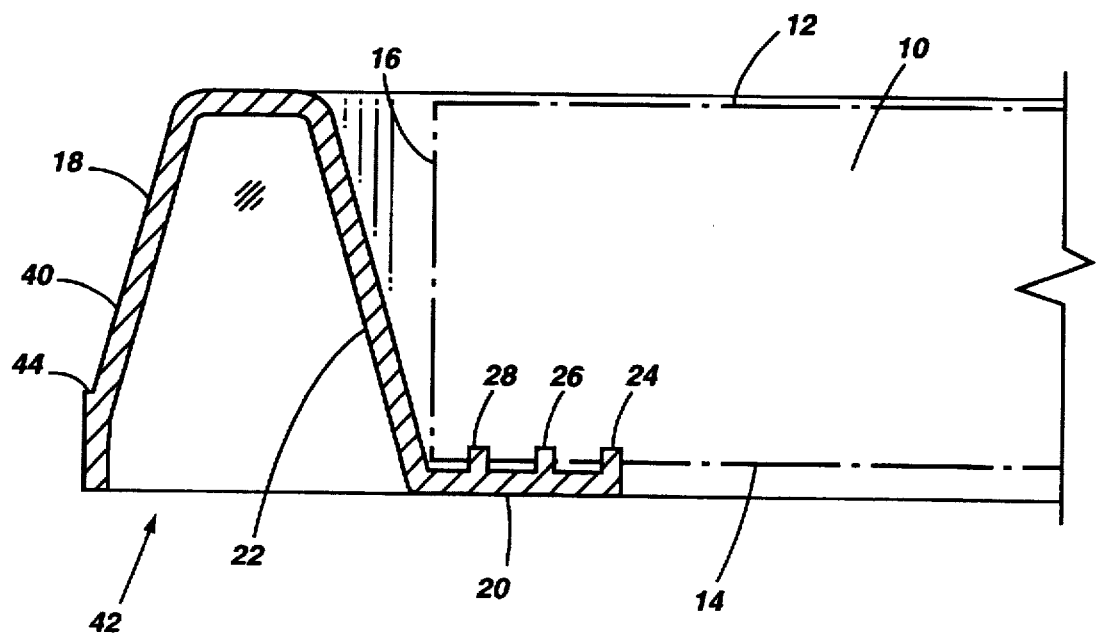
FIG. 2 is a view in vertical section taken substantially along the line 2—2 of FIG. 1 illustrating a segment of the filter of FIG. 1.

FIGS. 1 and 2 illustrate an embodiment of the invention. The filter 8 has a panel 10 of filter medium, having opposite major faces 12 and 14 (FIG. 2). The entire panel 10 preferably has a substantially uniform thickness in the uncompressed, operable state of the filter medium. The surrounding periphery 16 including all the peripheral side faces is not significantly pinched or otherwise compressed, and fluid entry into the filter medium is not blocked by the frame 18.

The frame 18 surrounds the periphery 16 of the filter medium panel 10. As illustrated in FIG. 2, the frame has, in cross-section, a first leg 20 which is bonded to the peripheral region of the lower major face 14 of the filter panel 10 near the periphery 16. A second leg 22 of the frame extends obtusely, that is at an angle greater than 90°, from the first leg 20 in order to permit nesting of multiple such frames when stacked and matingly engaged in a column. The second leg 22 is located outwardly of the filter medium periphery 16. This spacing from the periphery of the filter medium permits free exposure of the entire second major face 12 and peripheral side faces of the filter medium panel because no part of the frame extends over that second major face 12 or seats against the periphery 16 in the embodiment shown in FIGS. 1 and 2.

The frame 18 of FIGS. 1 and 2 is an extruded, thermoplastic material. A plurality of ridges, such as ridges 24, 26 and 28, are attached in, and extend longitudinally along, the first leg 20 of the frame and therefore extend entirely around the filter medium panel 10.

The use of this structure and the thermoplastic material of the frame 18 permit the filter medium to be bonded to the first leg 20 by first assembling the filter medium panel 10 in the frame 18 so that the ridges 24, 26, and 28 seat against a peripheral portion of the major face 14 of the filter medium panel 10 along an interface. Energy may then be applied to the region of the interface, such as by directing heated air, to soften and melt the thermoplastic ridges 24, 26 and 28 and thereby cause the thermoplastic material to flow into the interstices of the filter medium. Upon cooling, the thermoplastic material solidifies in the interstices of the filter medium thereby bonding the filter medium panel 10 to the frame 18.

Figure 3:
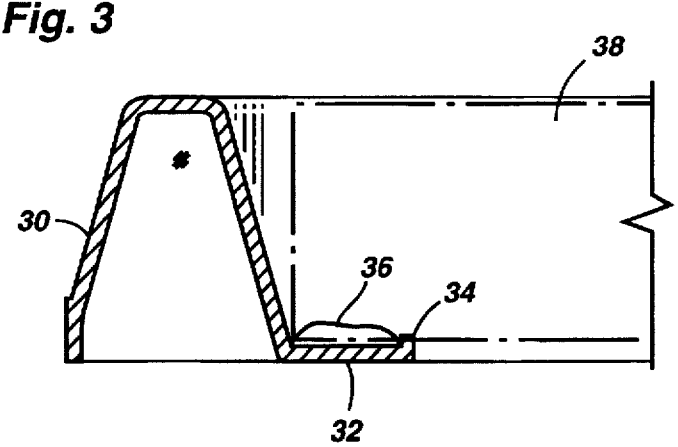
FIG. 3 is a view in section similar to the section of FIG. 2, but illustrating an alternative embodiment of the invention.

The filter medium panel may be bonded to the first leg of a filter frame embodying the present invention by other alternative bonding systems. For example, FIG. 3 illustrates a frame 30 with a first leg 32 having an upstanding ridge 34 at its inner end. A heat activated adhesive 36 is deposited upon the first leg 32 for bonding the filter medium panel 38 to the frame 30. The purpose of the leg is to provide a dam for confining the adhesive on the first leg when it is in a flowable or liquid state.

Figure 4:
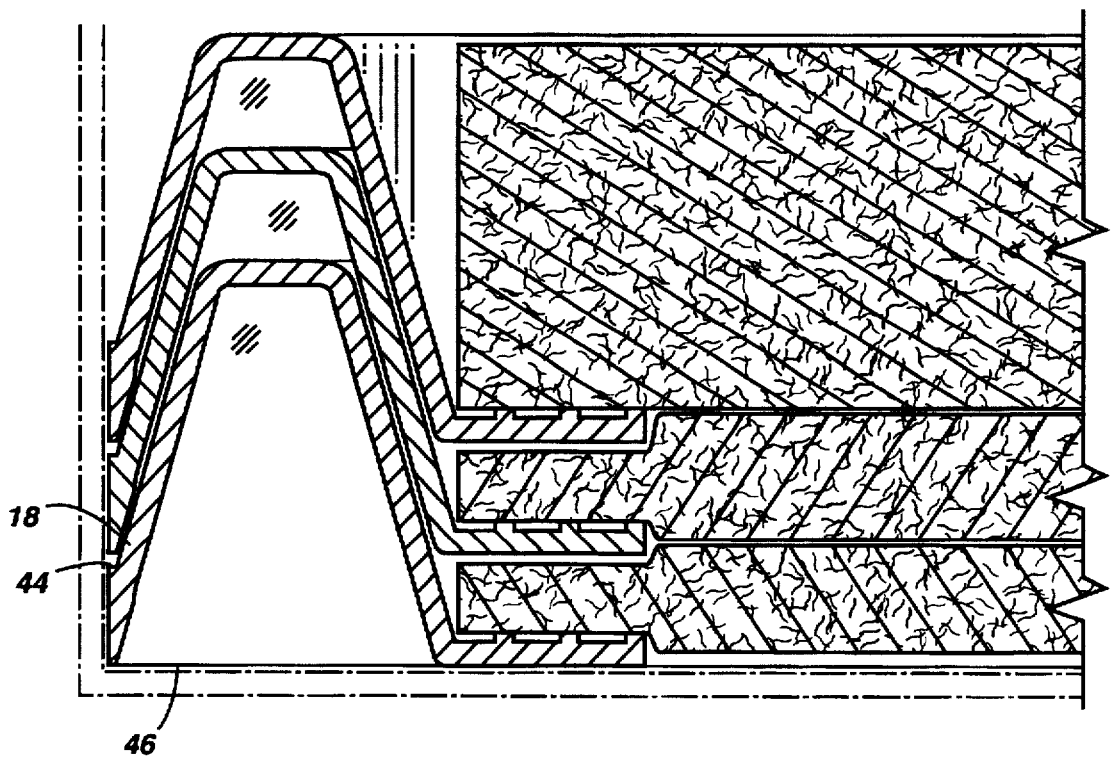
FIG. 4 is a view in section similar to the section of FIG. 2, but illustrating a plurality of stacked filters in a package.

A particularly advantageous feature of this method of constructing and assembling a filter is that a plurality of filters may be assembled and stacked as illustrated in FIG. 4 prior to bonding of the filter medium panel to the frame. Thus, after a plurality of filters are assembled and stacked, and if desired also compressed, the energy for heating is then applied simultaneously to the interface between the first leg and the filter medium of all of the assembled filters. Hot air may be directed through all of the filters to accomplish the hot air welding of each filter medium panel to its interfacing ridges on each first leg of each frame. Alternatively, conductive particles may be mixed into and distributed within the adhesive material 36 (FIG. 3) or within the ridges 24, 26 and 28 (FIG. 2) and then heated by electromagnetic wave energy. Such particles would include metal particles which can then be heated by applying microwave energy, and carbon particles which permit heating of the interface by means of lower frequency inductive heating. Consequently, the simultaneous bonding of the filter medium panels to the frame for each filter in an assembled stack improves manufacturing speed and efficiency and therefore reduces cost. The assembled stack may also be compressed and packaged before the energy application when electromagnetic wave energy is used for heating. The fact that the frame, regardless of the material of which it is constructed, is only one layer thick instead of two or more allows substantially more filters to be compressed and packaged in any given height.

As illustrated in FIG. 2, the filter frame 18 preferably also has a third leg 40 extending from and located outwardly of the second leg 22 to form a channel 42. This channel contour, which may be in a variety of channel shapes, substantially strengthens the rigidity of the frame 18. A projection 44 extends outwardly from the third leg 40 to form a stop or shelf. As illustrated in FIG. 3, the projection 44 provides a shelf upon which the upwardly adjacent, nested filter frame seats. The projection prevents the frames from nesting so far that they wedge together, and therefore assures that they can be easily pulled apart. The shelf of the projection 44 is located a distance from the lower edge 46 of the frame 18 which provides the desired compression of the filter medium panels when the filters are stacked and compressed. Preferably the height of the frame 18 is substantially or approximately equal to the height of the relaxed, uncompressed filter medium panel 10.

One advantage of an extruded resin frame is that all or part of the third leg 40 may be eliminated by blocking a portion of the extrusion die to form alternative frame cross-sectional shapes. Consequently, the same extrusion die may be used not only for the embodiment illustrated in FIGS. 1, 2 and 4, but also may be used to form abbreviated embodiments, including an embodiment in which the ridges 26 and 28 are eliminated, as in FIG. 3. A resin frame may alternatively be molded.

Figure 5:
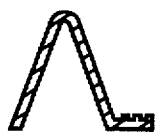
FIGS. 5, 6, and 7 are views in section illustrating alternative filter frames embodying the present invention.
Figure 6:
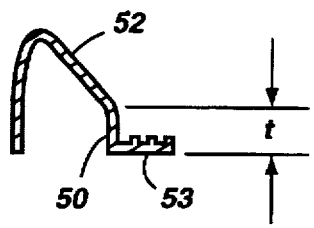
Figure 7:
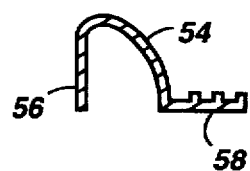

FIGS. 5, 6 and 7 are a few examples of various alternative channel shapes which may be used in embodiments of the invention. FIG. 5 illustrates a channel cross-section which is essentially a V-shape.

FIG. 6 illustrates a channel in which the second leg includes a first portion 50 connected to a second portion 52. The first portion 50 is at a right angle to the first leg 53 and the second portion 52 extends obtusely from the first portion 50. The first portion preferably has a height t which does not exceed the desired spacing between the nested frames and should correspond substantially to the thickness of the compressed filter medium panel. It is not necessary that the entirety of the second leg extend obtusely, so long as the leg, as a whole, including all its nested portions, extends sufficiently obtusely from the first leg to permit nesting.

The embodiment of FIG. 7 has a second leg 54 which is curved and smoothly blended into the third leg 56. This illustrates that the second leg which extends obtusely from the first leg 58, is not necessarily comprised of linear segments. It may be curved or have curved portions so that most of the tangents to the curve make obtuse angles with the first leg 58.

Figure 8:
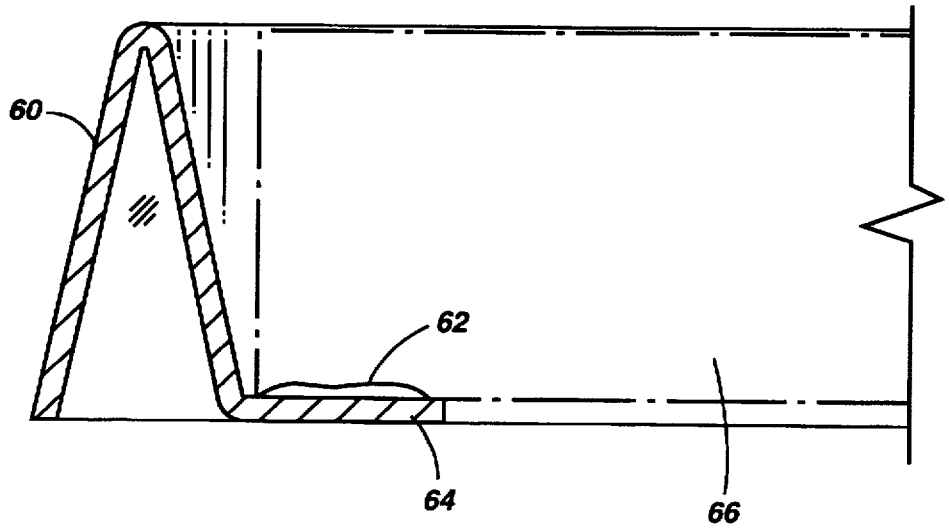
FIG. 8 is a view in vertical section similar to FIG. 1, but illustrating another embodiment of the invention.

FIG. 8 illustrates a filter constructed in accordance with the invention, but having a frame 60 fabricated more economically of a cardboard or chipboard material. With such a frame, a thermoplastic, hot melt or thermosetting adhesive 62 is deposited preferably upon the first leg 64 of the frame 60. Alternatively, an adhesive which sets as a result of drying due to the evaporation of a volatile material may also be used and its setting may be assisted by the application of energy to speed the drying in order to bond the filter medium 66 to the frame 60. Of course, if a thermoplastic adhesive is used on a plastic or resin-type frame, the melting temperature of the thermoplastic adhesive must be below that of the frame to avoid melting or distortion of the frame unless the application of energy is pinpointed in a spot weld-type arrangement.

The corners of the frame 60 may be bonded by any suitable means, including the use of tabs extending from one side of the frame to its adjoining neighbor and bonded into place by a suitable adhesive or fastener. Other suitable adhesives may also be used, such as UV cured adhesives or urea formaldehyde.

An adhesive is preferably applied to the first leg of the frame or less desirably around the periphery of the first major face of the filter medium in a thin layer in order to preferably bond to only the filter material, such as fibers, which are near the exterior surface of the filter. However, if excessive adhesive is used and the filter is compressed in the peripheral region before the adhesive is set, it is possible that some of the fibers in the interior of the medium may be contacted by the adhesive. As a result, the filter medium, when later removed from the package and permitted to expand for use, may not spring back entirely to the original medium thickness. However, because the filter medium seats against only the first leg of the filter frame along only one major face of the panel of filter medium, not only is the entirety of the second major face of the filter medium entirely freely exposed to the fluid flowing into the filter medium, but additionally the minor, peripheral sides of the filter medium are also exposed to the air flow to permit filtering activity. This additionally available flow path in embodiments of the invention compensates for any pinching which might occur in the peripheral region. Consequently, so long as the filter medium at the peripheral edge is at least 25% as thick as the remainder of the filter medium panel, this compensation will prevent the effective area of the filter medium from being substantially reduced as with prior art pinch frames.

Therefore, from the above description it can be seen that the invention allows attachment of the filter medium panel to the filter frame along a peripheral portion of only one major face of the panel by leaving the remainder of the filter panel free of contact with the frame and exposed to receive incoming fluid. This permits maintenance of a substantially uncompressed contour so that the entirety of the filter medium can be of substantially equal density and flow resistance. These characteristics permit fluid to flow in substantially uniform distribution through the entire area of the filter medium panel, and therefore homogeneous, efficient filtering is accomplished uniformly over the entire area. Embodiments of the invention also permit the filters to be stacked and packaged in a compressed state and further facilitate the inexpensive and rapid assembly and attachment of the filter medium to the frame. The use of hot air welding or electromagnetic energy applied to a thermoplastic frame or the application of a thermoplastic, hot melt or thermosetting adhesive to a paper or plastic frame enables the easy and inexpensive bonding of the filter medium panel to the filter frame and allows it to be accomplished after the frames are stacked, and if desired compressed.

Figure 9:
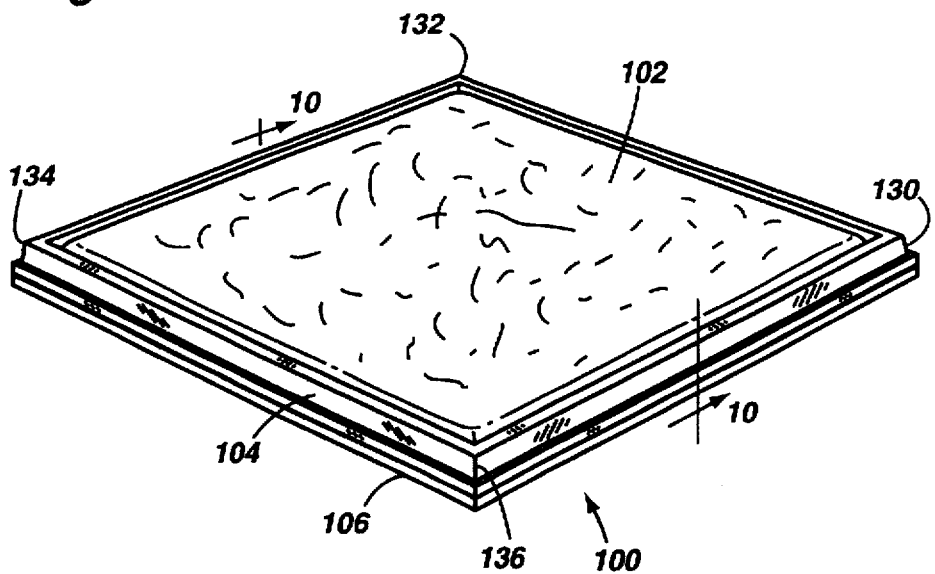
FIG. 9 is a view in perspective illustrating an alternative embodiment of the present invention.
Figure 10:
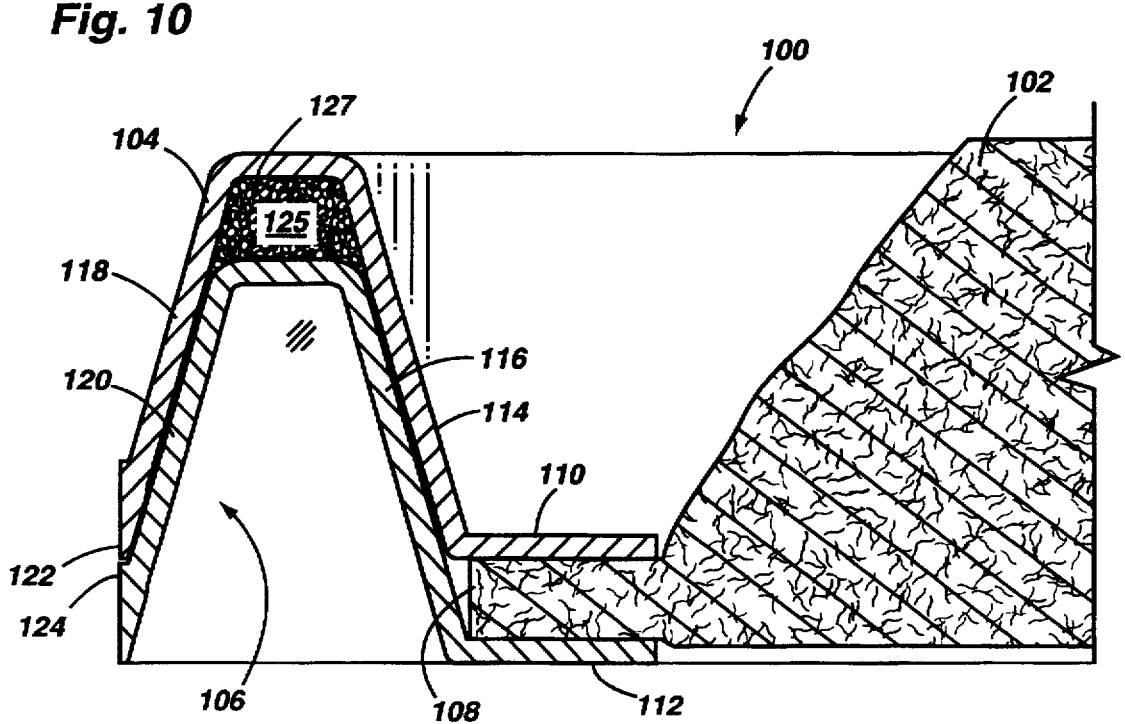
FIG. 10 is a side view in section through the line 10—10 of FIG. 9.

Although frames that pinch the edge of the filter medium reduce the effective area of the filter medium, this configuration is desirable when its benefits outweigh its disadvantages. The filter 100 of FIGS. 9 and 10 has a strength advantage. FIG. 9 shows a filter medium 102 surrounded by and attached to a frame member 104. A brace member 106 is attached to the underside of the frame 104. Referring to FIG. 10, the filter 100 is shown in section to illustrate the relative positioning of the frame 104 and the brace 106. Both the frame 104 and the brace 106 have a configuration similar to the frame 18 shown in FIG. 2, and are preferably made of paperboard. A peripheral edge 108 of the filter medium 102 is pinched between the first leg 110 of the frame 104 and the first leg 112 of the brace 106. The frame 104 has a second leg 114 which extends obtusely from the first leg 110, and the brace 106 has a second leg 116 which extends obtusely from the first leg 112. Additionally, a third leg 118 extends from the second leg 114 of the frame 104, and a third leg 120 extends from the second leg 116 of the brace 106.

Channels are formed between the second and third legs of the frame 104 and the second and third legs of the brace 106. In the preferred embodiment, the second and third legs of the brace 106 extend into the channel of the frame 104 until the lower edge 122 of the third frame leg 118 seats against the stop 124. The stop 124, therefore, affects the distance the brace 106 extends into the channel of the frame 104. Because the frame 104 and brace 106 are essentially identical, the frame 104 could extend into the channel of the brace 106. If the filter 100 nests with a similar filter, the frame 104 will extend within a channel of a brace.

When the frame 104 is ready to be attached to the brace 106 during assembly, the peripheral edge 108 of the filter medium 102 is positioned between the first legs 110 and 112. The frame 104 and brace 106 are then brought into contact, as the peripheral edge 108 of the filter medium 102 is compressed between, and clampingly engaged by, the first legs 110 and 112. The frame 104 and brace 106 are adhered in place by an adhesive which is applied to the contacting surfaces.

A chamber 125 is formed between, and its boundaries are defined by, the second and third legs of the frame 104 and the second and third legs of the brace 106 when the frame 104 and brace 106 are attached as in FIG. 10. The chamber preferably contains, and the frame 104 and brace 106 are preferably bonded together with, a rigid, adhesive foam 127, which is a cellular, porous material. The foam 127 preferably adheres to the interfacing surfaces of the second legs 114 and 116 and the third legs 118 and 120, bonding them together. In the preferred embodiment, the foam 127 also fills (or at least occupies a significant volume of) the chamber 125. Upon curing, the foam 127 hardens into a rigid, cellular structure adhered to the walls of the chamber 125. It is not necessary for the second and third legs of the frame 104 and brace 106 to be adhered together and the chamber to be filled with foam 127. However, by having both, the strength of the filter is further enhanced. The foam 127 can be applied prior to assembly of the frame 104 and brace 106, or subsequently by injection into the chamber 125, or both.

The foam 127 in the chamber 125 rigidifies the filter 100, especially at the corners 130, 132, 134 and 136 shown in FIG. 9 which are points where frame weakness can be apparent to someone handling the filter 100. As the chamber is exposed to tension, compression, and shear forces during bending or twisting of the filter 100, the rigid foam 127 resists any deformation, and thereby increases the rigidity of the "box-beam" structure formed by the legs of the frame 104 and brace 106. The foam 127 allows thinner, less expensive and lighter weight paperboard to be used to construct the frame 104 and brace 106 while making the corners stronger than with a single-layer, thicker paperboard frame.

It will become apparent that various adhesives or fasteners can be used to fasten the legs of the frame 104 and the brace 106 together. Additionally, no cellular foam or other filler needs to occupy the chamber 125, since a box-beam is formed by the legs surrounding and defining the chamber 125. However, the Applicant has found that filling the chamber 125 with a rigid, lightweight cellular foam 127 is preferred, due to the strength enhancing characteristics it provides. If weight is not a consideration, or if greater strength is important, a solid, (noncellular) rigid material can be substituted for the foam 127.

The filter 100 is nestable with other similar filters as described for the filter 8 of FIGS. 1 and 2 and shown stacked in FIG. 4. Fewer filters similar to the filter 100 will be stackable within the same space as the filter 8 shown in FIGS. 1 and 2, because of the greater thickness of the frame elements in the filter 100. The spacing of the frame 104 and brace 106 necessary to form the chamber 125 causes the filter 100 to occupy a greater nesting space than the filter 8 of FIGS. 1 and 2.

Figure 11:
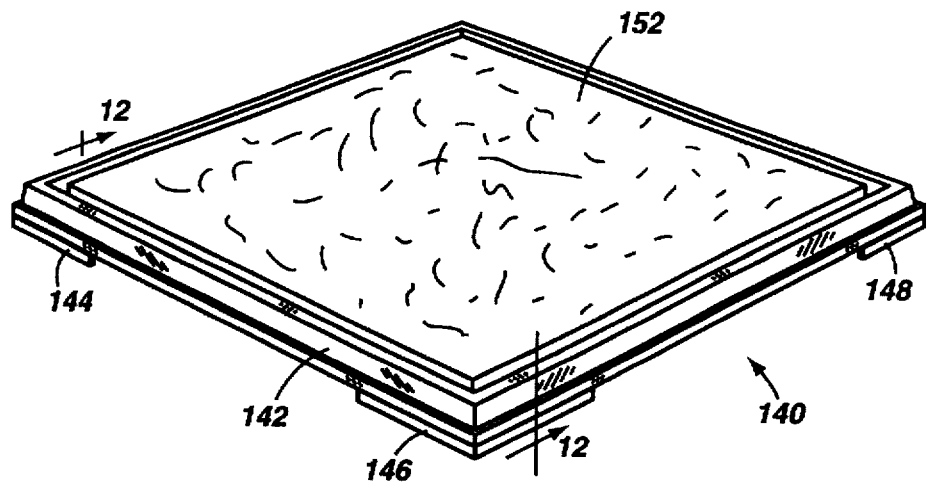
FIG. 11 is a view in perspective illustrating an alternative embodiment of the present invention.
Figure 12:
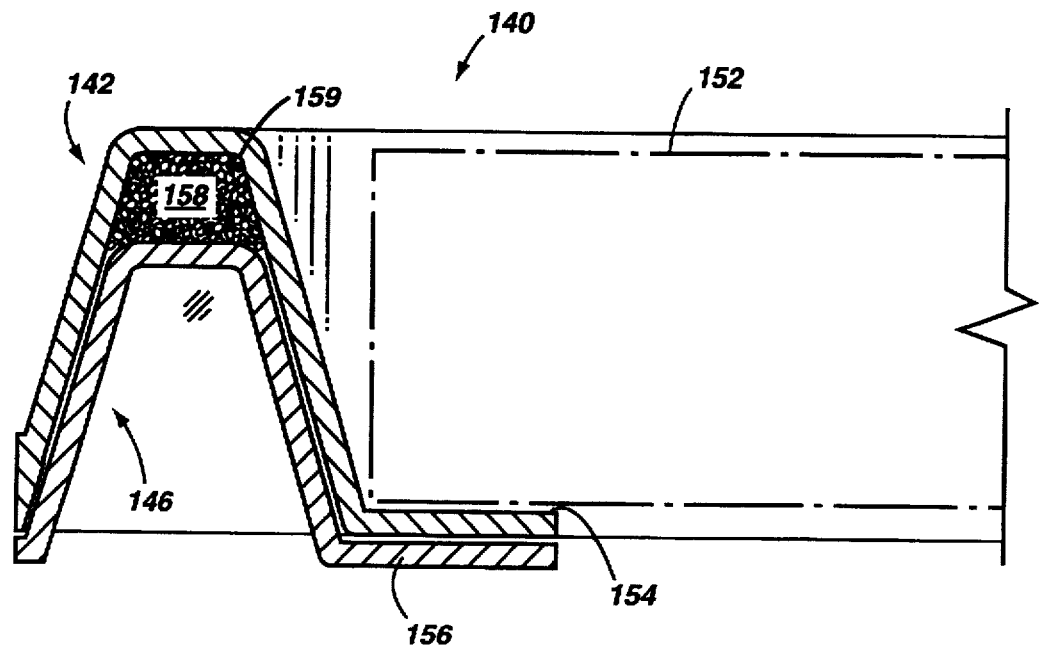
FIG. 12 is a side view in section through the line 10—10 of FIG. 9.
Figure 13:
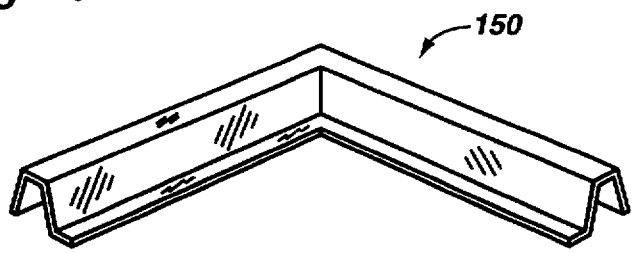
FIG. 13 is a view in perspective illustrating a corner brace.
Figure 17:
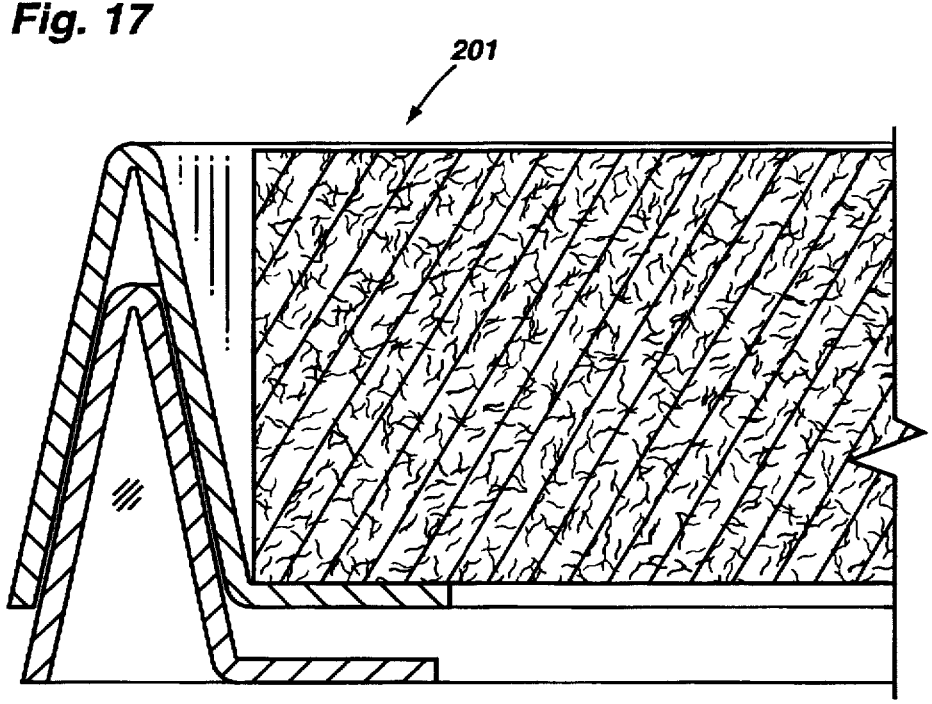
FIG. 17 is a side view in section illustrating an alternative filter.

An alternative structure is contemplated in which the filter medium 102 is only adhered to the upper surface of a filter frame, and is not pinched. This avoids the decrease in effective surface area which occurs at a pinched peripheral filter edge. This could, of course, be accomplished with the filter 100 of FIGS. 9 and 10 by adhering the filter medium 102 to the top surface of the first leg 110 of the frame 104. An example of a similar structure is the filter 201 shown in FIG. 17. An example of a more preferred filter having this adhesive-only attachment is shown in FIGS. 11 and 12, and it is noted that an advantage of the present invention is its ability to have the filter medium attached to the frame by either, or both, forms of attachment. The filter 140 includes a frame 142 similar to the frame 104 of FIGS. 9 and 10. However, four corner braces 144, 146, 148 and 150 (brace 150 is not visible in FIG. 11) support the frame 142 only at the corners. The braces 144-150 are L-shaped segments, having cross-section similar to the brace 106, and are attached to the frame 142 at the four corners. Therefore, rigidity is greatly enhanced at the corners, but not between them. The brace 150, which is identical to the braces 144, 146 and 148, is shown in perspective view in FIG. 13.

Referring now to FIG. 12, which is a view through line 12—12 of FIG. 11, the brace 146 is shown mounted to the frame 142, and the filter medium 152 is attached to the frame 142 by adhesion without pinching. The brace 146 is not identical in cross-section to the frame 142, since no space needs to be created between the first leg 154 of the frame 142 and the first leg 156 of the brace 146 to clampingly engage the filter medium 152. Instead, the filter medium 152 is adhered to the top surface of the first leg 154 of the frame 142 and the first leg 156 of the brace 146 seats against the underside of, and supports, the first leg 154. The chamber 158 is preferably filled with a rigid cellular material, such as the foam 159. The foam 159 adheres the braces 144-150 to the frame 142. The filter 140 is also nestable with similarly shaped filters.

Figure 15:
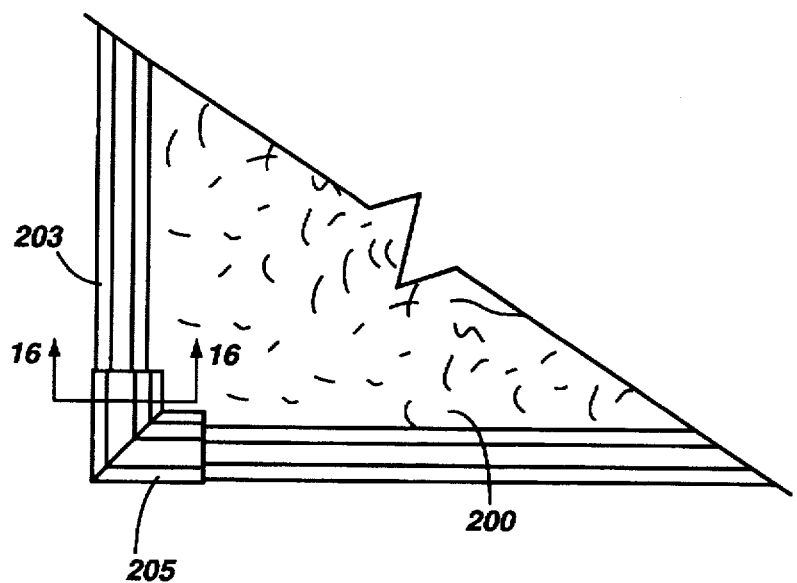
FIG. 15 is a top view illustrating an alternative filter.
Figure 16:
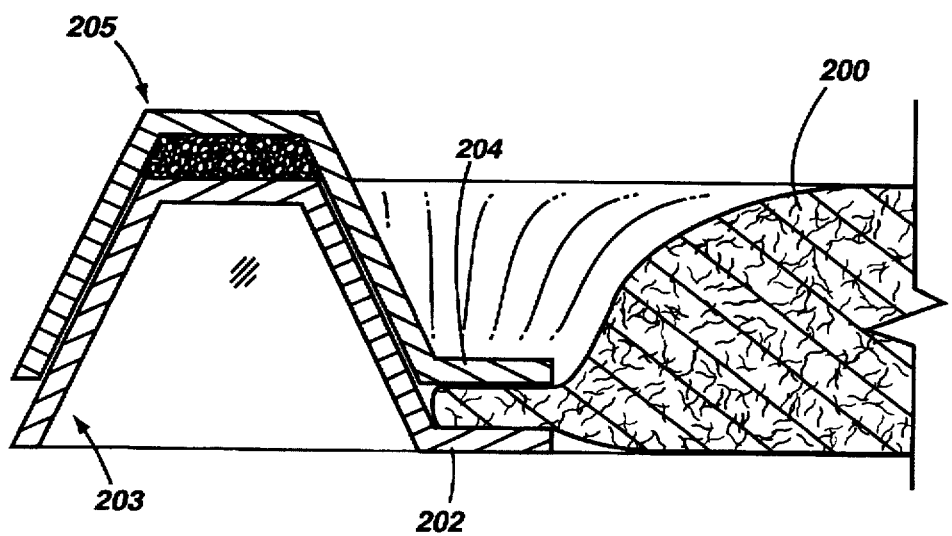
FIG. 16 is a side view in section through the line 16—16 of FIG. 15.

Of course, the first leg 156 of the brace 146 could be eliminated because it does not serve the ordinary function of a first leg: to provide an attachment to the filter medium. Another first leg is not needed in the FIG. 12 embodiment because the filter medium 152 is not mounted to the frame 142 by pinching. Additionally, corner braces could alternatively be mounted on top of the frame 142. Furthermore, the filter medium could be adhered to the first leg 154 of the frame 142 and also pinched between the frame 142 and the braces 144-150 as shown in FIGS. 15 and 16. The filter medium 200 is adhered around its entire periphery to the first leg 202 of the frame 203. The filter medium is also pinched between the first leg 202 of the frame 203 and the first leg 204 of the brace 205 at the corner shown. A similar brace clamps the filter medium 200 at each corner.

Figure 14:
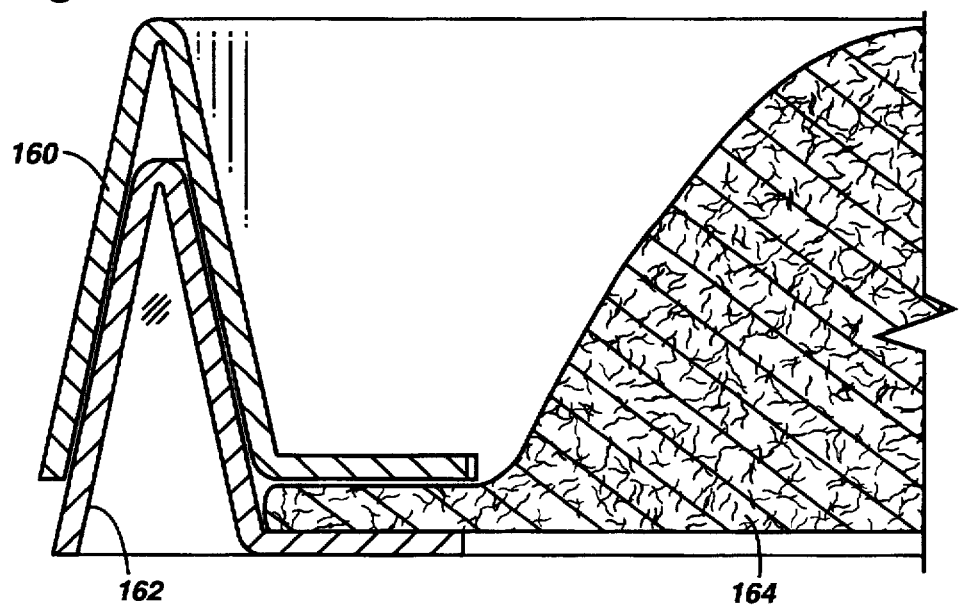
FIG. 14 is a side view in section through the line 10—10 of FIG. 9.

FIG. 14 shows an alternative frame 160 and attached brace 162. The frame 160 and brace 162 are identical in cross-section to one another prior to attachment together. When the upper end of the brace 162 is inserted in the channel formed in the frame 160, the filter medium 164 is compressed as in the preferred embodiment. Since there is no stop or other structure which is specifically designed to limit the travel of the brace 162 into the frame 160, the compressibility of the filter medium 164, or the distance the brace 162 is displaced, will determine the distance of travel. However, the compression force which tends to insert the brace 162 into the channel formed in the frame 160 also tends, after some displacement, to cause the legs of the frame 160 forming the channel to be spread apart. The dimensions of the channel of the brace 162 are substantially identical to the dimensions of the channel of the frame 160, but because the brace 162 has a finite thickness, the brace 162 begins to displace the legs of the frame 160 after contact begins and as insertion continues. The legs of the frame 160 are forced apart as the brace 162 is inserted into the channel of the frame 160 and the points of contact between them move closer to the fulcrum. It is preferred that after insertion is completed the spread legs of the frame 160 be bent inwardly and adhered to the exterior of the brace 162. Therefore, although the frame 160 and the brace 162 are identical prior to assembly, the frame 160 must be bent to close gaps formed during assembly due to the thickness of the legs of the inserted brace. Of course, because the frame 160 is identical to the brace 162, their relative positions can be reversed with no change in attachment steps.

Figure 18:
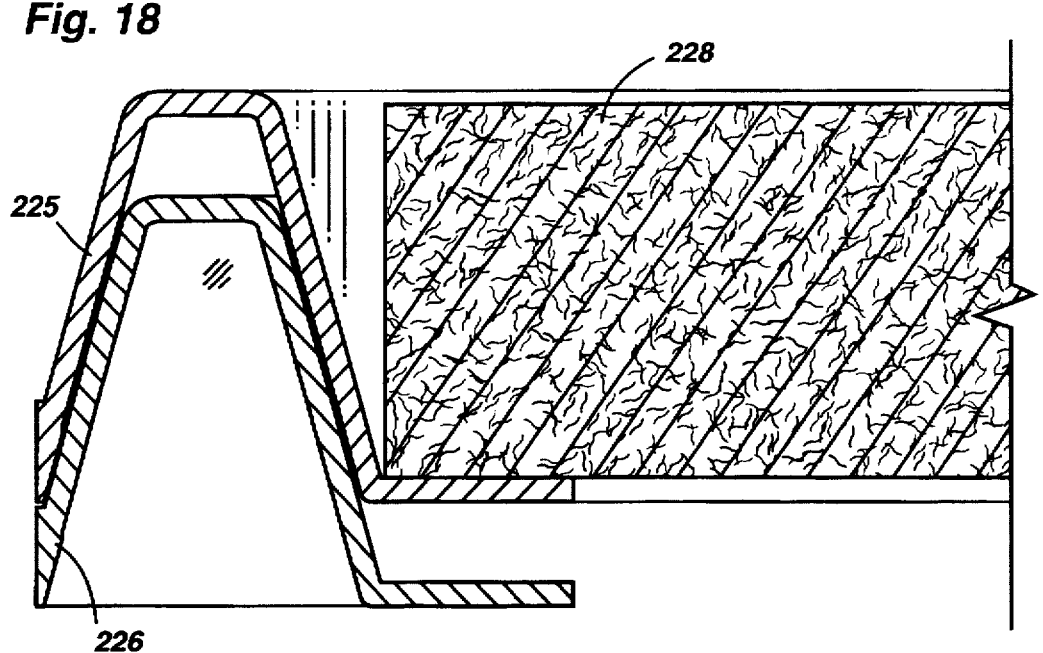
FIG. 18 is a side view in section illustrating an alternative filter.
Figure 19:
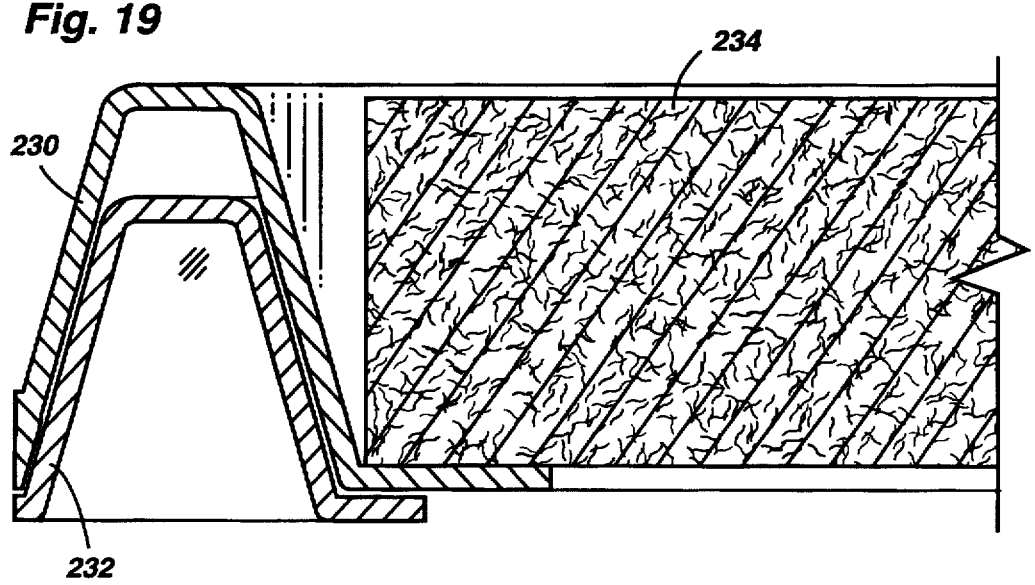
FIG. 19 is a side view in section illustrating an alternative filter.
Figure 20:
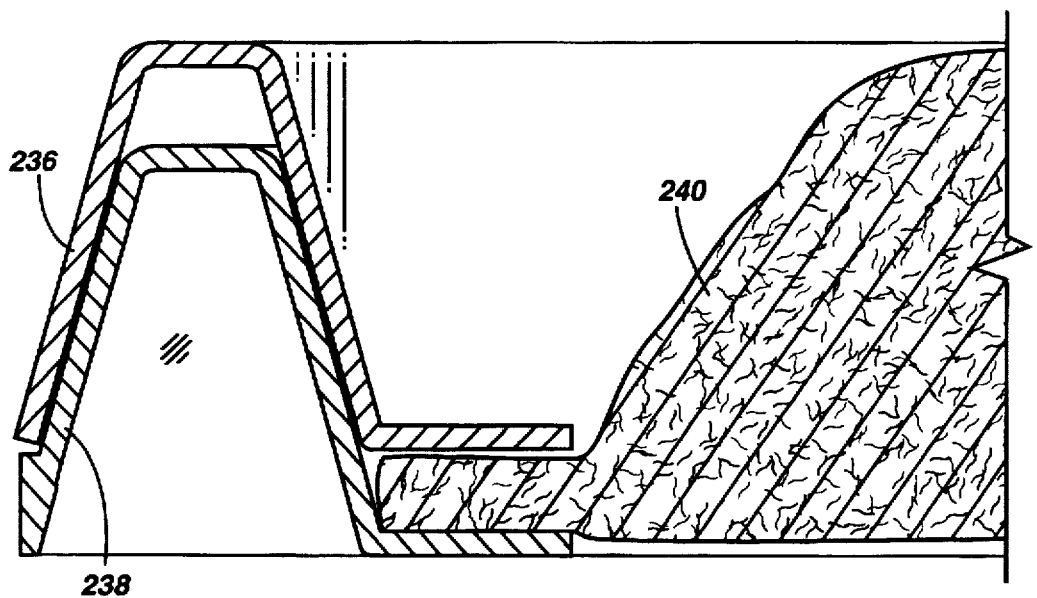
FIG. 20 is a side view in section illustrating an alternative filter.
Figure 21:
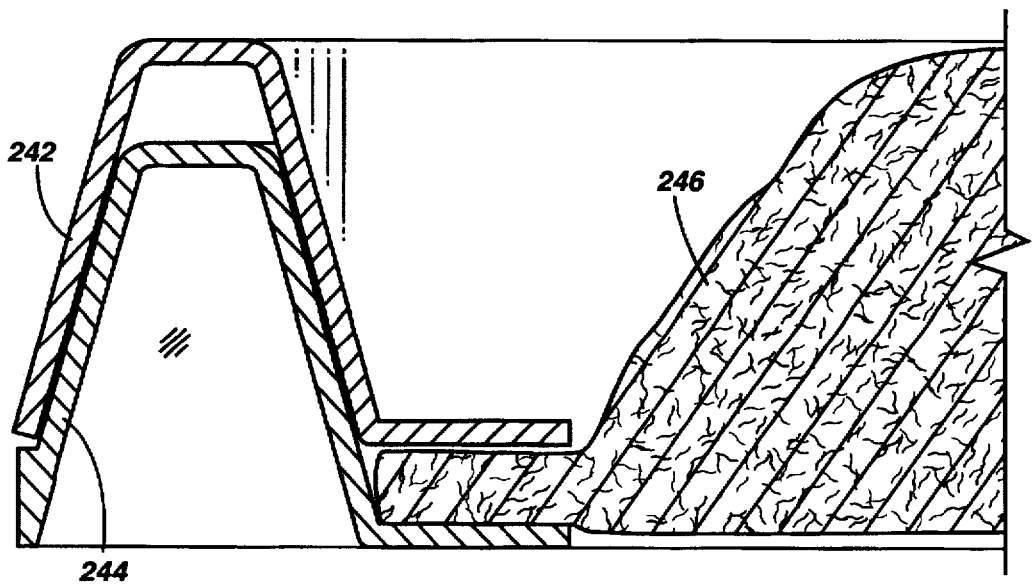
FIG. 21 is a side view in section illustrating an alternative filter.

It will become apparent to one of ordinary skill in the art that many combinations of identical or dissimilar frames, fastening means for attaching the brace to the frame, and means for attaching the filter medium to the frame/brace structure, other than those shown, can be obtained consistent with the general principle of the present invention. For example, FIG. 18 shows a frame 225 which is essentially identical to a brace 226. The brace 226 is of the L-shaped, corner-only type attached to the corners of the frame 225. The filter medium 228 attaches by adhesive to the frame 225 without being pinched. Another example of an alternative is shown in FIG. 19, in which a frame 230 has an attached brace 232 which is different in cross-section from the frame 230. The filter medium 234 is attached by adhering to the frame 230 without pinching. In still another example, the frame 236 shown in FIG. 20 is different in cross-section from the brace 238. The filter medium 240 is pinched in place between the frame 236 and the brace 238, both of which extend around the entire periphery of the filter medium 240. In FIG. 21 the brace 242 is of the L-shaped, corner-only type which attaches to the corners of the different cross-section frame 244. The filter medium 246 is adhered to the frame 244 around its peripheral edges. The filter medium 246 is pinched between the frame 244 and the brace 242 only at the corners.

In view of the above alternatives and the many others which are possible, it is preferred that the frame and the brace in the present invention be virtually identical to require manufacture of only two copies of one part for each filter. Furthermore, it is preferred that each frame/brace include a stop for the other to positively seat against. Without a stop, bending of the members is necessary to promote adhesion over a large surface area. It is also preferred to pinch the filter medium between first legs of a frame and brace.

While certain preferred embodiments of the present invention have been disclosed in detail, it is to be understood that various modifications may be adopted without departing from the spirit of the invention or scope of the following claims.

I claim:

1. A filter comprising:

(a) a filter medium panel having peripheral edges and first and second opposite major faces;

(b) a frame member surrounding the peripheral edges of the filter medium panel, the frame member having a cross-section comprising a first leg abutting the first major filter medium panel face near its periphery, a second leg extending obtusely from the first leg permitting nesting and spaced outwardly of the filter medium panel, and a third leg extending from and located outwardly of the second leg to form a channel between the second and third legs; and (c) a brace member mounted to the frame member, said brace member having a cross-section comprising a second leg and a third leg extending from and located outwardly of the second leg to form a channel between the second and third legs, wherein the second and third legs of one member are nested within the channel of the other member forming a chamber between, and defined by, the second and third legs of the frame member and the second and third legs of the brace member.

2. A filter in accordance with claim 1, wherein the brace further comprises a first leg, and the second leg extends obtusely from the first leg.

3. A filter in accordance with claim 2, further comprising second, third and fourth braces, each of the braces mounted to the frame at a different frame corner.

4. A filter in accordance with claim 2, wherein the brace surrounds the peripheral edges of the filter medium panel.

5. A filter in accordance with claim 3, wherein the filter medium panel is bonded, near a periphery of the filter medium panel, to the first leg of the frame.

6. A filter in accordance with claim 4, wherein the filter medium panel is bonded, near a periphery of the filter medium panel, to the first leg of the frame.

7. A filter in accordance with claim 3, wherein the first leg of each brace abuts the second major filter medium panel face near a periphery of the filter medium panel, and the filter medium panel is clampingly engaged between the first leg of the frame and the first legs of the braces.

8. A filter in accordance with claim 4, wherein the first leg of the brace abuts against the second major panel face of the filter medium near a periphery of the filter medium panel, and the filter medium panel is clampingly engaged between the first leg of the frame and the first leg of the brace.

9. A filter in accordance with claim 7, wherein a projection extends outwardly from the third leg of the frame to seat against at least one of the adjacent nested braces.

10. A filter in accordance with claim 8, wherein a projection extends outwardly from the third leg of the frame to seat against the adjacent nested brace.

11. A filter in accordance with claim 7, wherein a projection extends outwardly from the third leg of at least one of the braces to seat against the adjacent nested frame.

12. A filter in accordance with claim 8, wherein a projection extends outwardly from the third leg of the brace to seat against the adjacent nested frame.

13. A filter in accordance with claim 7, wherein the second leg of each brace is adhered to the second leg of the frame, and the third leg of each brace is adhered to the third leg of the frame.

14. A filter in accordance with claim 8, wherein the second leg of the brace is adhered to the second leg of the frame, and the third leg of the brace is adhered to the third leg of the frame.

15. A filter in accordance with claim 13, wherein the chamber contains a cellular, porous material adhered to the legs defining the chamber's boundaries.

16. A filter in accordance with claim 14, wherein the chamber contains a cellular, porous material adhered to the legs defining the chamber's boundaries.

17. A filter in accordance with claim 1, wherein the chamber contains a cellular, porous material adhered to the legs defining the chamber's boundaries.

* * * * *